United States Patent
Maidla et al.

(10) Patent No.: US 9,694,879 B2
(45) Date of Patent: Jul. 4, 2017

(54) METHOD FOR AUTOMATICALLY MEASURING TIMES OF VARIOUS OPERATIONS IN FLOATING VESSEL PIPE DEPLOYMENT

(71) Applicant: TDE Thonhauser Data Engineering GmbH, Leoben (AT)

(72) Inventors: William R. Maidla, Sugar Land, TX (US); Arthur H. F. Kanematsu, Macae (BR); Philipp Zoellner, Leoben (AT)

(73) Assignee: TDE Thonhauser Data Engineering, GmbH, Leoben (AT)

( * ) Notice: Subject to any disclaimer, the term of this patent is extended or adjusted under 35 U.S.C. 154(b) by 134 days.

(21) Appl. No.: 14/533,127

(22) Filed: Nov. 5, 2014

(65) Prior Publication Data

US 2016/0123500 A1    May 5, 2016

(51) Int. Cl.
*F16L 1/20* (2006.01)
*B63B 35/03* (2006.01)
*F16L 1/235* (2006.01)

(52) U.S. Cl.
CPC .............. *B63B 35/03* (2013.01); *F16L 1/235* (2013.01)

(58) Field of Classification Search
CPC combination set(s) only.
See application file for complete search history.

(56) References Cited

U.S. PATENT DOCUMENTS

| | | | |
|---|---|---|---|
| 3,695,350 A | 10/1972 | Petersen | |
| 4,238,824 A * | 12/1980 | DeMatte | G01C 21/165 405/154.1 |
| 4,297,054 A | 10/1981 | Yenzer et al. | |
| 5,691,903 A * | 11/1997 | Racette, III | B63B 35/03 405/158 |
| 6,892,812 B2 | 5/2005 | Niedermayr et al. | |
| 7,886,845 B2 | 2/2011 | King et al. | |
| 2005/0109870 A1 | 5/2005 | Krise et al. | |
| 2007/0203623 A1 | 8/2007 | Saunders et al. | |
| 2010/0232884 A1 | 9/2010 | Roodenburg et al. | |
| 2013/0101355 A1 | 4/2013 | Thompson et al. | |

OTHER PUBLICATIONS

International Search Report and Written Opinion, International Application No. PCT/US2015/058549.

* cited by examiner

*Primary Examiner* — Kyle Armstrong
(74) *Attorney, Agent, or Firm* — Richard A. Fagin

(57) ABSTRACT

A method for determining start and stop times of at least one selected operation on a pipe deployment vessel includes measuring either or both tension on a pipe deployed from a reel on the vessel and velocity of pipe motion with respect to the vessel. Rotational velocity of the reel is measured. Geodetic position of the vessel with respect to time is measured. The start and stop times of the at least one selected operation are determined from the measured tension, motion velocity, rotational velocity and geodetic position. The start and stop times are recorded.

18 Claims, 2 Drawing Sheets

METHOD FOR AUTOMATICALLY MEASURING TIMES OF VARIOUS OPERATIONS IN FLOATING VESSEL PIPE DEPLOYMENT

BACKGROUND

This disclosure is related to the field of pipeline deployment from floating, self-propelled vessels. More specifically, the disclosure relates to methods for automatically detecting a beginning time of specific pipeline deployment operations and recording elapsed times thereof as well as intermediate times.

U.S. Pat. No. 4,297,054 issued to Yenzer et al. describes a pipe laying vessel and method for deploying pipe from the vessel. Methods and techniques disclosed in the foregoing patent are related to the control of pipe laying operations from a self-propelled reel pipe laying vessel. The methods are concerned with (1) controlling pipeline geometry as a function of pipe entry angle into the water and tension on the pipeline; (2) monitoring the excursion of the pipeline outside certain defined limits and controlling the pipeline geometry based on such measured excursions; and (3) compensating for pipeline induced turning moments which would otherwise tend to draw the pipe laying vessel off course and off the predetermined pipeline right of way.

DETAILED DESCRIPTION

Figure 1:
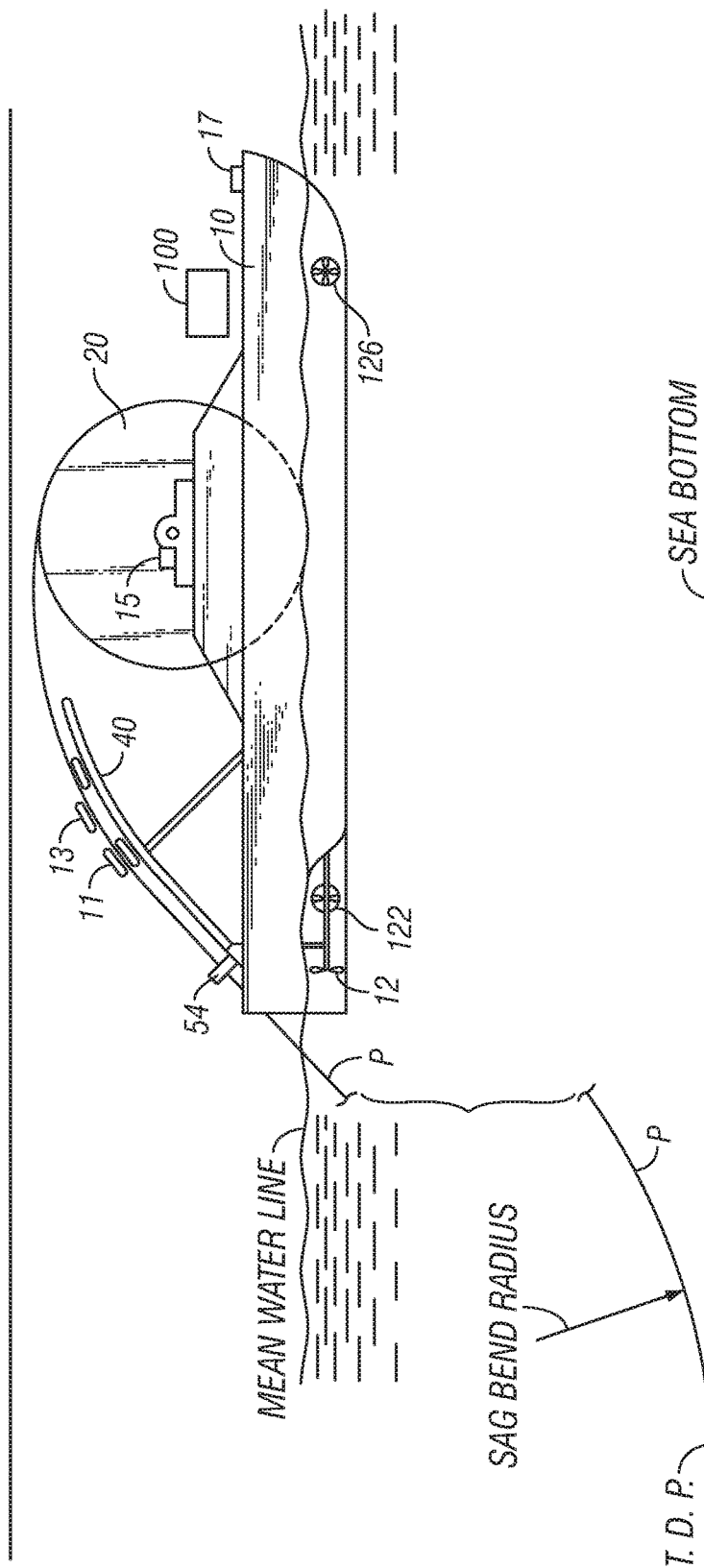
FIG. 1 shows an example pipeline deployment vessel with sensors and a computer system.

FIG. 1 shows an example "Apache-type" reel pipe laying vessel 10 having an adjustable pipe carrying ramp assembly 40 pivotably mounted (generally at the stern) to the deck of the vessel 10, aft of a pipe reel 20. The pipe reel 20 may initially have a selected length and diameter pipe P wound thereon for deployment into a body of water. The vessel 10 may also comprise main propulsion propellers 12, one or more forward lateral thrusters 126 and one or more stern lateral thrusters 122. Reference is made herein to the main propellers as providing the requisite forward thrust; it will be appreciated by those skilled in the art, however, that other suitable propulsion devices could be provided to generate the necessary forward thrust and the reference to "propellers" in this disclosure is intended to encompass other such suitable propulsion devices. Pipe handling equipment, which may include, for example, an adjustable radius control member, adjustable straightener tracks, tensioner tracks, pipe clamping assemblies, guide roller assemblies, and pipe angle measuring assembly, may be mounted to the ramp assembly 40.

An Apache-type reel pipe laying vessel has the ability to discharge pipe into the water at any desired angle within its operating range of between about 15 degrees and 65 degrees, preferably between about 18 degrees and 60 degrees. The adjustable ramp assembly 40 of an Apache-type vessel permits the angle of entry of the pipe P into the water to be preset and maintained during a pipe deployment operation; the ramp assembly 40 guides the pipe P as it enters the water at a preset exit angle. The adjustable exit angle feature of the Apache-type deployment vessel may enable it to handle a wider range of pipe sizes in a greater range of water depths than other types or deployment vessel. An example embodiment of a pipe deployment vessel as described herein is set forth in more detail with reference to pipe laying features in U.S. Pat. No. 4,297,054 issued to Yenzer et al. It is to be clearly understood that the example pipe deployment vessel described herein is only used as an example of pipe deployment vessels that may be used in accordance with methods of the present disclosure and the type and configuration of the deployment vessel is not to be construed as limitations on the scope of the present disclosure.

One of the possible advantages of the presently described adjustable ramp assembly 40 for setting the pipe exit angle is the substantial elimination of an "overbend" region (i.e., the bend region occurring as the pipe translates downwardly from the relatively horizontal plane of the vessel 10 toward the sea bed in the substantially vertical plane of the catenary). The ramp angle and tension may be set so that downstream of the straightener/tensioner apparatus, the pipe P will be unsupported; thus, pipe exiting the straightener mechanism and traveling along the ramp assembly 40 will already be in its nominal catenary configuration before and as it enters the water. Preferably, as the pipe P moves through the straightener mechanism toward the water, all or substantially all of the curvature imparted to the pipe P by the reel 20 and other pipe handling elements is removed so that pipe P exiting from the straightener mechanism has substantially zero residual stress and zero residual bending moments.

By initially setting the ramp angle and nominal pipeline tension to virtually eliminate the overbend as a factor in determining and controlling the final residual pipeline characteristics, sag bend (i.e., the bend occurring in the translation of the pipe from the vertical to the horizontal plane on the sea bottom) may become an important factor in the control of the pipe P as it is deployed. The sag bend is controlled, at least in part, as a function of the tension maintained on the pipe by the functional elements of the pipe deployment vessel 40, including the reel 20, straightener/tensioner elements vessel drive assembly, etc. Controlled tension may be imparted to the pipe by (1) the reel 20 through a reel drive mechanism operating as a dynamic brake, (2) the main vessel drive thrust acting through the vessel main propellers and/or the lateral thruster assemblies, and (3) the tensioner assembly, which may or may not be used, through a regulated tensioning force established at the beginning of a lay operation and generally maintained throughout the pipe deployment operation.

The desired pipe deployment tension and the desired entry angle of the pipe P into the water may be determined on the basis of information supplied by the pipeline designer. Such information from the pipeline designer (or customer-pipeline owner) includes (1) the size of the pipe, including internal pipe diameter and wall thickness, (2) the type or grade of pipe, including such information as the pipe material and minimum yield strength, (3) maximum allowable stress, strain and residual tension, and (4) water depth along the pipeline right of way. An optimum nominal tension and lay angle can be determined from these parameters.

One of the criteria which have been developed for laying pipe with an Apache-type vessel is that the maximum allowable working stress due to the pipe deployment operation, in the unsupported length of pipe between the vessel and the sea bottom should not be greater than about 85% of the minimum yield strength of the pipe. It is also desirable and preferable to minimize the tension imparted to the pipe by the vessel while maintaining operating conditions such that the maximum allowable stress limit and the maximum allowable residual tension in the pipeline are not exceeded. This may be accomplished by setting the ramp assembly angle (and thus the pipe entry angle into the water) in conjunction with nominal pipe tension such that the tightest sag bend radius will be achieved without exceeding the above-noted stress and residual tension limit.

The ramp assembly 40 angle (and thus the pipe entry angle into the water) is set at the beginning of the pipe deployment operation and is normally not changed during the entire lay operation. It is possible to alter the ramp angle during a pipe laying operation, for example, to account for (appreciable) changes in water depth. During the pipe-laying operation, control of the pipe as it is being laid is maintained by controlling the tension in the pipe. Such control is normally achieved through adjustments in the reel torque and/or tensioner setting and/or in the vessel forward and/or lateral thrust. Under certain operating conditions, the "flexible" towing connection between a reel barge and its tug will not be adequate to maintain the necessary continuous tension on the pipeline as it is being laid. The tug moves independently of the barge due to wave action. This means that the motive source which provides the forward thrust necessary to maintain tension on the pipeline is susceptible to uncontrolled variations relative to the barge and thus to the pipe. Limited excursions of this type may be acceptable for some sizes of pipe and some sea conditions. However, the range of permitted excursions is relatively small and decreases, particularly with increasing pipe size and increasingly rough sea conditions.

A self-propelled reel-carrying vessel may have the advantage that the forward thrust producing motive force can be considered to be coupled directly to the pipe end on board the vessel 10 so that relative movement between the motive source and the pipe end connected to the vessel 10 is reduced essentially to zero. Further, external forces produced by waves, winds, current, etc. act on the pipe and motive source together and at the same time. Since the motive source and pipe end are substantially directly coupled, the pipe is more directly responsive and more rapidly responsive to changes in thrust. The self-propelled vessel 10 can therefore operate in a greater range of sea conditions, and particularly adverse sea conditions, than can a towed barge.

In the present example, embodiment, a pipe motion sensor 11 may be provided that measures speed of movement of the pipe P through the ramp assembly 40. Another sensor (tension sensor) 13 may be provided to infer tension applied to the pipe P as it passes over the ramp assembly 40, for example a load cell that is arranged to measure downward or upward force applied to the tension sensor 13 transverse to the longitudinal direction of the pipe P so as to be able to infer an amount of axial tension loading on the pipe P. A rotary speed sensor 15 may be affixed to the reel 20 so as to provide a measurement corresponding to the rotational speed of the reel 20. A geodetic position signal receiver 17, such as a Global Positioning System (GPS) satellite signal receiver may be disposed on the vessel 10 in a convenient location.

The ramp assembly 40 may include at one end "slips" 54 or similar device to hold the pipe P in place while relieving tension thereon above (toward the vessel end of the pipe P) the slips 54 by continued operation of the reel R. Such operation may be used in some embodiments wherein the vessel 10 comprises more than one reel. Such vessels may be used for conditions wherein the length of pipe needed to be carried aboard the vessel exceeds the capacity of a single reel. Under such conditions, for example, the pipe P may be held in the slips 54, the reel R may be continued to unspool the pipe P thereon, and an end of the pipe from the reel P may be joined to an end of a pipe on a second (or any additional number) of reels (not shown in FIG. 1 for clarity of the illustration).

Signals from each of the foregoing sensors 11, 13, 15, 17 may be conducted by cabling and/or wirelessly to a computer system or processor 100, to be described in more detail below. The computer system or processor 100 may use signals from the foregoing sensors to determine the particular pipe deployment operation in progress at any time, and to record the elapsed time of such operation(s). The computer system may also be programmed to measure elapsed time between such operations.

Figure 2:
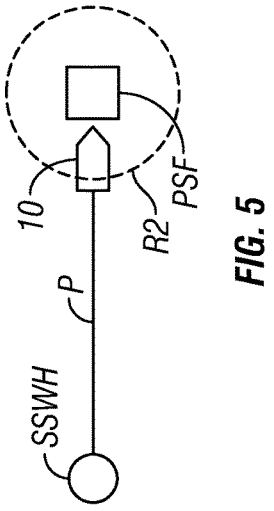
FIG. 2 shows the pipeline deployment vessel approaching a subsea wellhead.

Examples of various operations that may be undertaken by the pipeline deployment vessel may be better understood with reference to FIGS. 2 through 6. Referring first to FIG. 2, a subsea wellhead SSWH or other device proximate the water bottom may be located at a known geodetic position. The subsea wellhead SSWH is intended to be connected by a pipeline, such as pipe (P in FIG. 1) to another facility at a different known geodetic position. An example of such facility may be a floating production storage and offloading vessel (FPSO), a production platform with or without crude oil storage and processing equipment or any other device to which produced fluids from the subsea wellhead ("wellhead") SSWH are to be transported by the pipe (P in FIG. 1). Collectively, such facilities may be referred to for purposes of the present description as a production storage and/or processing facility ("production facility") PSF. In FIG. 2, the pipeline deployment vessel ("vessel") 10 is moving toward the wellhead SSWH, but none of the pipe (P in FIG. 1) is being deployed. In such operation, the GPS receiver (17 in FIG. 1) will indicate that the geodetic position of the vessel 10 is changing, however the tension sensor (13 in FIG. 1), the pipe motion sensor (11 in FIG. 1) and the reel rotary motion sensor (15 in FIG. 1) may indicate that there is substantially no tension loading on the pipe (P in FIG. 1) and that the pipe and reel are not moving. The sensor measurements may be conducted to the computer system (100 in FIG. 1) which may then determine based on the foregoing measurement conditions that the vessel 10 is navigating but not deploying pipe.

Figure 3:
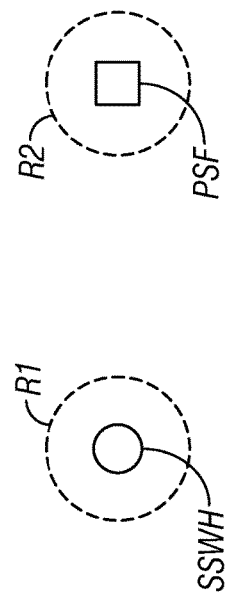
FIG. 3 shows the pipeline deployment vessel proximate the subsea wellhead wherein pipeline deployment operations may begin.

In FIG. 3, the vessel 10 is shown as being within a predetermined distance R1 from the wellhead SSWH, and the GPS receiver may indicate that the vessel 10 is not moving. When pipe deployment begins, the reel rotation sensor will indicate rotation to extend the pipe (P in FIG. 1) from the vessel 10, the pipe motion sensor will indicate movement of the pipe into the water and the tension sensor will indicate increasing tension on the pipe as the pipe is extended to the depth of the wellhead SSWH proximate the water bottom. Such operation may be referred to as "vertical deployment" and may be calculated by the computer system 100 using the measurement conditions described above.

Determining that the vessel 10 is within the predetermined distance R1 from the wellhead SSWH may be performed by comparing the measurements from the GPS receiver to the known geodetic position of the wellhead SSWH in the computer system (100 in FIG. 1).

Figure 4:
FIG. 4 shows the pipeline deployment vessel moving toward a production storage and/or processing facility while deploying pipe into the water.

In FIG. 4, after vertical deployment is completed, and the pipe P is connected to the wellhead SSWH, for example, using a remotely operated vehicle (ROV), the vessel may begin movement toward the production facility PSF while simultaneously deploying the pipe P. In such operation, the pipe motion sensor and the reel rotation sensor will indicate that pipe is being removed from the reel and deployed into the water, while the GPS receiver will indicate the vessel 10 is moving toward the production facility PSF.

Figure 5:
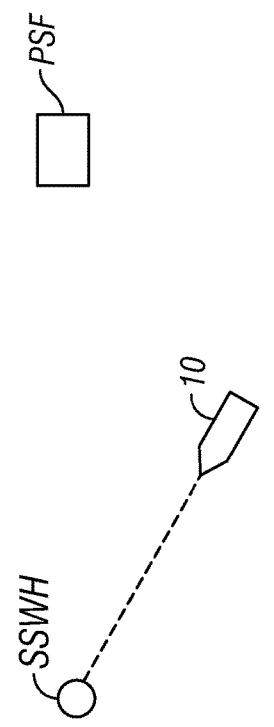
FIG. 5 shows the pipeline deployment vessel stopped proximate the production storage and/or processing facility while pipeline connection to the facility may be made.

In FIG. 5, the vessel 10 has moved to within a selected distance R2 from the production facility PSF to enable connection of the pipe P to a connection therefor (not shown) of any type known in the art for connecting pipe to a production facility or FPSO. Such connection may be made, for example, using a ROV. Determining that the vessel 10 is within the predetermined distance R2 from the production facility PSF may be determined by comparing measurements made by the GPS receiver to the know geodetic position of the production facility PSF. In FIG. 5, the vessel 10 may be stopped, and such may be determined by the measurements made by the GPS receiver. During making of a connection between the pipe P and the production facility PSF, the rotation sensor and the pipe movement sensor may indicate that the reel and pipe are not moving with respect to the vessel 10. Such combination of measurements made by the respective sensors may be used to infer that the pipe P is being connected to the production facility PSF.

Figure 6:
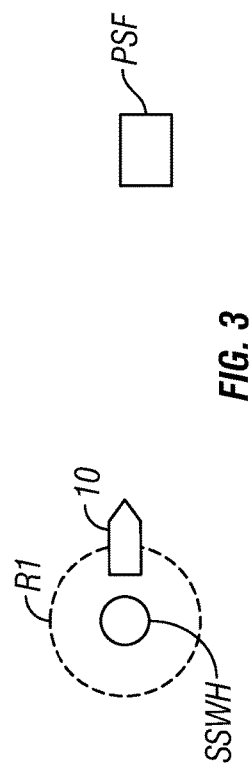
FIG. 6 shows the pipeline deployment vessel deploying pipeline into the water for purposes of temporary deployment.
Figure 6:
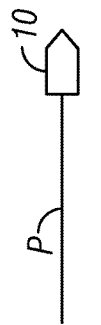

FIG. 6 shows another example vessel operation in which the vessel 10 is moving, and pipe P is being deployed into the water for temporary storage and subsequent retrieval. The operations described with reference to FIG. 6 may be determined by using the GPS receiver measurements such that the computer system (100 in FIG. 1) determines the vessel 10 path is not between the wellhead SSWH and the production facility PSF. Measurements of pipe movement, pipe tension and reel rotation may be used as explained above to enable the computer system (100 in FIG. 1) to determine which operation is being undertaken.

For all of the foregoing operations, a start time and stop time may be recorded by the computer system upon detection of the conditions indicating start and stop of each of the described operations based only on the sensor measurements as described above. By recording the start and stop times of each operation, an elapsed time to perform each operation may be determined. Such elapsed time may be normalized for water depth and/or distance between, e.g., the wellhead SSWH and the production facility PSF to enable the system user to enhance the efficiency of operations.

In methods according to the present disclosure, the particular operation being undertaken by the vessel may be determined using only measurements of the geodetic position of the vessel (and/or with respect to time), the velocity of the pipe through the tensioner and/or the amount of tension on the pipe and the rotational velocity of the reel. Table 1 below provides definitions of the various parameters defined in a logic table (TABLE 2). TABLE 2 provides examples of using only the foregoing parameter measurements to determine the start time and stop time of certain vessel operations. The parameter measurements made by the sensors explained with reference to FIG. 1 may be communicated to the computer system or processor, wherein start and stop times of the various operations as defined in TABLE 2 may be determined. The start and stop times of each determined operation may be recorded, thus enabling determination of the elapsed time for each of the particular operations. The vessel operator may use the elapsed times to assist in determining procedures for optimizing vessel operations and/or reducing elapsed time to carry out any one or more of the example operations defined in TABLE 2. It is to be understood that the operations described in TABLE 2 are not an exhaustive list of possible pipe deployment vessel operations, and are only to be considered as examples.

TABLE 1

| | Definitions |
|---|---|
| Abandonment | The PLSV is leaving a string of pipe (e.g., riser lines, umbilicals, etc.) on the bottom of the ocean without connecting it to the WH or FPSO (or any offshore production unit) |
| Bad Data | Receiving data but of insufficient quality to be analyzed |
| Connection | The PLSV is performing a connection operation of two pipelines on deck (e.g., riser lines, umbilicals, etc.) |
| GPS | Global Positioning System geodetic position (longitude and latitude) |
| Launching | The PLSV is launching production pipe |
| Navigation | The PLSV is moving without launching pipe |
| No Data | Not receiving data from the sensors at the appropriate frequency |
| Other | Any category that doesn't fit the major categories that are being measured |
| PI1 | pull-In 1, the PLSV is sending the first end of the pipe line (e.g.: riser lines, umbilicals, etc.) to the FPSO |
| PI2 | Pull-In 2, the PLSV is sending the second end of the pipe line to the FPSO |
| PLSV | Pile Laying System Vessel - Any vessel that is self-propelled (and in some embodiments dynamically positioned) that is used for deploying production pipes or other pipes that support a production system (umbilicals, parasitic pipes, any other pipe or cable needed in conjunction with the production pipe system. |
| PSF | Floating Production Storage Offtake (or any offshore production storage and/or processing facility) geodetic position (GPS: Long./Lat.) |
| Recovery | The PLSV is retrieving a string of pipe from the bottom of the ocean that is not necessarily connected to the WH or PSF |
| Retrieving | The PLSV is retrieving the production pipeline to the PLSV |
| Rv | The value of velocity of the Reel or Basket (it can be positive if turning in one direction, zero, or negative if turning in the opposite direction) |
| Sgps | Ship Position (longitude/latitude) |
| SSWH | Sub Surface Well Head Position (geodetic position Long./Lat.) |
| Stopped | The PLSV is Stopped without performing a major operation like connecting, etc. |
| Sv | PLSV navigation velocity |

TABLE 1-continued

| Definitions | |
|---|---|
| Tt | The value of tension in the pipe tensioner |
| Tv | The value of velocity of the pipe tensioner |
| VDC1 | Vertical Direct Connection of the first end of the production pipe to the SSWH |
| VDC2 | Vertical Direct Connection of the second end of the production pipe to the SSWH |

TABLE 2

| OPERATIONS | | |
|---|---|---|
| Navigation | $Sv \neq 0$ and $Tv = 0$ and $Rv = 0$ | $Sv = 0$ |
| Preparation for Abandonment 1 | 1. Sgps is far from SSWH or SPF AND<br>2. Sv = 0 (start) AND<br>3. Tv = 0 and Rv = 0 AND<br>4. The previous Major Operation was Navigation | The next operation is Abandonment 1 |
| Preparation for VDC1 | 1. Sgps is close to the WH AND<br>2. Sv = 0 (start) AND<br>3. Tv = 0 and Rv = 0 AND<br>4. The previous Major Operation was Navigation<br>5. Note: there is no preparation for VDC1 if previous operation was VDC2 | The next operation is VDC1 |
| Preparation for Pull-In 1 | 1. Sgps is close to the FPSO AND<br>2. Sv = 0 (start) AND<br>3. Tv = 0 and Rv = 0 AND<br>4. The previous Major Operation was Navigation<br>5. Note: there is no Preparation for Pull-In 1 if previous operation was Pull-In 2 | The next operation is Pull-In 1 |
| Preparation to Retrieve | 1. Sv = retrieving velocity (start) AND<br>2. Tv = 0 and Rv = 0 AND<br>3. The previous Major Operation was Navigation | The next operation is Retrieve |
| Vertical direct connection 1 | 1. Sgps is close to the SSWH AND<br>2. Sv = 0 AND<br>3. Rv > 0 (start) THEN Tv > 0 AND<br>4. The previous Major Operation was Preparation or Connection between VDC1 | The next operation is:<br>Launching OR<br>Connection during VDC1 |
| Vertical direct connection 2 | 1. Sgps is close to SSWH (within water depth distance) AND<br>2. Rv = 0 THEN Tv = 0 AND<br>3. Tt = 0 (start) THEN<br>4. Sv = launching velocity AND<br>5. The previous operation was Launching. | The next operation is:<br>Navigation OR VDC1 |
| Launching | 1. Sv = launching velocity (start) AND<br>2. Tv > 0 OR Rv > 0 | 1. Sv = 0 OR<br>2. Tv = 0 OR Rv = 0 |
| Stopped during navigation | 1. Sgps is far from the SSWH or SPF<br>2. Sv = 0 (start)<br>3. Tv = 0 and Rv = 0 and Tt = 0<br>4. The previous Major Operation was Navigation | The next operation is Navigation |
| Stopped during launching | 1. Sv = 0 (start)<br>2. Tv = 0 and Rv = 0 and Tt$\neq$0<br>3. The previous Major Operation was Launching | The next operation is Launching |
| Stopped during retrieving | 1. Sv = 0 (start)<br>2. Tv = 0 and Rv = 0 and Tt$\neq$0<br>3. The previous Major Operation was Retrieving | The next operation is retrieving |

TABLE 2-continued

| | OPERATIONS | |
|---|---|---|
| Navigation | $Sv \neq 0$ and $Tv = 0$ and $Rv = 0$ | $Sv = 0$ |
| Retrieving | 1. $Sv$ = retrieving velocity (start) AND<br>2. $Tv < 0$ AND $Rv < 0$ AND THEN (when the production pipe doesn't contact the ocean floor)<br>1. Previous Operation is Retrieving AND<br>2. $Sv = 0$ AND<br>3. $Tv < 0$ and at retrieving velocity AND<br>4. $Rv < 0$ and at retrieving velocity | Next operation is Connection during retrieving OR Navigation |
| Connection While Launching | 1. Previous operation was Launching<br>2. $Sv = 0$ (start) and $Rv > 0$ and $Tv > 0$ THEN<br>$Sv = 0$ and $Rv = 0$ and $Tv > 0$ THEN<br>3. $Sv = 0$ and $Tv = 0$ and $Rv = 0$ and $Tt = 0$ then<br>4. $Sv = 0$ and $Tv = 0$ and $Rv > 0$ then<br>5. $Sv = 0$ and $Tv > 0$ and $Rv > 0$ | Next Operation is Launching |
| Connection While VDC1 | 1. Previous operation was VDC1 AND<br>2. $Sv = 0$ (start) and $Rv > 0$ and $Tv > 0$ THEN<br>$Sv = 0$ and $Rv = 0$ and $Tv > 0$ THEN<br>3. $Sv = 0$ and $Tv = 0$ and $Rv = 0$ and $Tt = 0$ THEN<br>4. $Sv = 0$ and $Tv = 0$ and $Rv > 0$ THEN<br>5. $Sv = 0$ and $Tv > 0$ and $Rv > 0$ | Next operation is VCD1 or Launching (if last connection) |
| Connection While Retrieving | 1. Previous operation was Retrieving AND<br>2. $Sv = 0$ (start) and $Rv < 0$ and $Tv < 0$ THEN<br>$Sv = 0$ and $Rv = 0$ and $Tv = 0$ THEN<br>$Sv = 0$ and $Rv < 0$ and $Tv < 0$ THEN<br>3. $Sv = 0$ and $Tv = 0$ and $Rv < 0$ and $Tt = 0$ THEN<br>4. $Sv = 0$ and $Tv < 0$ and $Rv = 0$ THEN<br>5. $Sv = 0$ and $Tv < 0$ and $Rv < 0$ | Next Operation is Retrieving |
| Pull-in 1 | 1. Sgps is close to the SPF AND<br>2. $Sv = 0$ AND<br>3. $Tv = 0$ and $Tt = 0$ and $Rv > 0$ (start) AND<br>4. Previous operation was Navigation or Pull-in2 | Next Operation is Launching |
| Pull-in 2 | 1. Sgps is close to the SPF AND<br>2. $Sv = 0$ (start) and $Rv = 0$ and $Tv = 0$ THEN<br>3. $Rv = 0$ and $Tt > 0$ THEN<br>4. $Rv = 0$ and $Tt = 0$ AND<br>4. Previous operation was Launching | Next operation is Pull-in 1 OR Navigation |
| Abandonment 1 | 1. Sgps is far from the SSWH or FPSO AND<br>2. $Sv = 0$ AND<br>3. $Rv > 0$ (start) THEN $Tv > 0$ AND | Next operation is Launching OR Connection During Abandonment 1 |

TABLE 2-continued

| | OPERATIONS | |
|---|---|---|
| Navigation | Sv≠0 and Tv = 0 and Rv = 0 | Sv = 0 |
| Abandonment 2 | 4. The previous Major Operation was Preparation for Abandonment 1 OR connection during Abandonment 1<br>1. Sgps is far from the SSWH or FPSO AND<br>2. Sv = 0 (start) AND<br>3. Rv = 0 THEN Tv = 0 AND<br>4. The previous Operation was Launching<br>5. THEN Sv = launching velocity | Next operation is Navigation OR Abandonment 1 |

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining start and stop times of at least one selected pipe laying operation from a plurality of different pipe laying operations on a pipe deployment vessel, comprising:
    measuring tension on a pipe deployed from a reel on the vessel;
    measuring velocity of pipe motion with respect to the vessel;
    measuring rotational velocity of the reel;
    measuring geodetic position of the vessel with respect to time;
    automatically determining the start and stop times of the at least one selected pipe laying operation from the measured tension, motion velocity, rotational velocity and geodetic position when the measured tension, motion velocity rotational velocity and geodetic position meet selected measurement conditions;
    recording the start and stop times of the at least one selected operation to enable determination of procedures for optimizing vessel operations and
    performing pipe laying operations from the vessel using the optimized vessel operations procedures.

2. The method of claim 1 wherein the start and stop times of the selected pipe laying operation are determined when the measured geodetic position is within a selected distance from a geodetic position of a subsea wellhead.

3. The method of claim 1 wherein the start and stop times of the selected pipe laying operation are determined when the measured geodetic position exceeds a selected distance from a geodetic position of a subsea wellhead.

4. The method of claim 1 wherein the start and stop times of the selected pipe laying operation are determined when the measured geodetic position is within a selected distance from a geodetic position of a production storage and processing facility.

5. The method of claim 1 wherein the start and stop times of the selected pipe laying operation are determined when the measured geodetic position exceeds a selected distance from a geodetic position of a production storage and processing facility.

6. The method of claim 1 wherein the selected pipe laying operation comprises at least one of vessel navigation, deployment preparation, vertical direct pipe connection, pipe deployment from the vessel, connecting the pipe to a subsea wellhead, connecting pipe to a production storage and processing facility and retrieving pipe from a body of water.

7. A method for determining start and stop times of at least one selected pipe laying operation from a plurality of pipe laying operations on a pipe deployment vessel, comprising:
    measuring velocity of pipe motion with respect to the vessel;
    measuring tension on the pipe;
    measuring rotational velocity of a pipe storage reel disposed on the vessel;
    measuring geodetic position of the vessel with respect to time;
    automatically determining the start and stop times of the at least one selected pipe laying from the measured tension, motion velocity, rotational velocity and geodetic position when the measured tension, motion velocity rotational velocity and geodetic position meet selected measurement conditions;
    recording the start and stop times of the at least one selected pipe laying operation to enable determination of procedures for optimizing vessel operations; and
    performing pipe laying operations from the vessel using the optimized vessel operations procedures.

8. The method of claim 7 wherein the start and stop times of the at least one selected pipe laying operation are determined when the measured geodetic position is within a selected distance from a geodetic position of a subsea wellhead.

9. The method of claim 7 wherein the start and stop times of the at least one selected pipe laying operation are determined when the measured geodetic position exceeds a selected distance from a geodetic position of a subsea wellhead.

10. The method of claim 7 wherein the start and stop times of the at least one selected pipe laying operation are determined when the measured geodetic position is within a selected distance from a geodetic position of a production storage and processing facility.

11. The method of claim 7 wherein the start and stop times of the at least one selected pipe laying operation are determined when the measured geodetic position exceeds a selected distance from a geodetic position of a production storage and processing facility.

12. The method of claim 7 wherein the at least one selected pipe laying operation comprises at least one of vessel navigation, deployment preparation, vertical direct pipe connection, pipe deployment from the vessel, connecting the pipe to a subsea wellhead, connecting pipe to a production storage and processing facility and retrieving pipe from a body of water.

13. An automated method, using a computerized system, for determining start and stop times of at least one selected pipe laying operation from a plurality of pipe laying operations on a pipe deployment vessel, comprising:

measuring at least one of tension on a pipe deployed from a reel on the vessel and velocity of pipe motion with respect to the vessel;

measuring rotational velocity of the reel;

measuring geodetic position of the vessel with respect to time;

conducting the measured tension, pipe motion velocity, rotational velocity and geodetic position to a computer, the computer automatically determining the start and stop times of the at least one selected pipe laying operation from the measured tension, motion velocity, rotational velocity and geodetic position when the measured tension, motion velocity rotational velocity and geodetic position meet selected measurement conditions;

recording the determined start and stop times of the at least one selected pipe laying operation to enable determination of procedures for optimizing vessel operations; and performing pipe laying operations from the vessel using the optimized vessel operations procedures.

14. The method of claim 13 wherein the start and stop times of the at least one selected pipe laying operation are determined when the measured geodetic position is within a selected distance from a geodetic position of a subsea wellhead.

15. The method of claim 13 wherein the start and stop times of the at least one selected pipe laying operation are determined when the measured geodetic position exceeds a selected distance from a geodetic position of a subsea wellhead.

16. The method of claim 13 wherein the start and stop times of the at least one selected pipe laying operation are determined when the measured geodetic position is within a selected distance from a geodetic position of a production storage and processing facility.

17. The method of claim 13 wherein the start and stop times of the at least one selected pipe laying operation are determined when the measured geodetic position exceeds a selected distance from a geodetic position of a production storage and processing facility.

18. The method of claim 13 wherein the at least one selected pipe laying operation comprises at least one of vessel navigation, deployment preparation, vertical direct pipe connection, pipe deployment from the vessel, connecting the pipe to a subsea wellhead, connecting pipe to a production storage and processing facility and retrieving pipe from a body of water.

* * * * *